(12) United States Patent
Sugiyama et al.

(10) Patent No.: US 6,873,748 B2
(45) Date of Patent: Mar. 29, 2005

(54) OPTICAL MODULATOR MODULE AND OPTICAL MODULATOR

(75) Inventors: Masaki Sugiyama, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 10/273,093

(22) Filed: Oct. 18, 2002

(65) Prior Publication Data

US 2003/0147575 A1 Aug. 7, 2003

(30) Foreign Application Priority Data

Feb. 7, 2002 (JP) ........................................ 2002-031484

(51) Int. Cl.⁷ .............................................. G02F 1/035
(52) U.S. Cl. ............................................... 385/2; 385/1
(58) Field of Search .................................. 385/2, 3, 14

(56) References Cited

U.S. PATENT DOCUMENTS

| | | | | |
|---|---|---|---|---|
| 5,208,697 A | | 5/1993 | Schaffner et al. ............ | 359/254 |
| 5,408,544 A | * | 4/1995 | Seino ............................. | 385/3 |
| 5,455,876 A | * | 10/1995 | Hopfer et al. .................. | 385/2 |
| 5,572,610 A | * | 11/1996 | Toyohara ....................... | 385/14 |
| 5,712,933 A | * | 1/1998 | Nishimoto et al. ............ | 385/9 |
| 6,192,167 B1 | * | 2/2001 | Kissa et al. .................... | 385/3 |

FOREIGN PATENT DOCUMENTS

| | | |
|---|---|---|
| EP | 0661577 | 7/1995 |
| JP | 03184014 | 8/1991 |
| JP | 5-241115 | 9/1993 |
| JP | 1994-235891 | 8/1994 |
| JP | 07128623 | 5/1995 |
| JP | 2651183 | 5/1997 |
| JP | 2663486 | 6/1997 |
| JP | 2821349 | 8/1998 |
| JP | 10239648 | 9/1998 |
| JP | 2000-275589 | 6/2000 |
| JP | 10-213783 | 8/2000 |
| JP | 2000-249995 | 9/2000 |
| WO | WO 9117470 | 11/1991 |

* cited by examiner

Primary Examiner—Phan T. H. Palmer
Assistant Examiner—Jennifer Doan
(74) Attorney, Agent, or Firm—Staas & Halsey LLP

(57) ABSTRACT

The invention provides an optical modulator module by which a dip appearing in a frequency characteristic of a microwave from a DC component to a high-frequency component can be reduced while maintaining the mechanical strength and facilitating handling of a substrate and besides securing the long-term reliability without processing the substrate itself. The optical modulator module includes a substrate, an optical modulator including an optical waveguide, a signal electrode, and a ground electrode, and a housing in and to which the optical modulator is accommodated and secured. The shape of a longitudinal section of the other portion of the optical modulator module than the substrate is asymmetrical with respect to a perpendicular line with which the portion of the signal electrode which extends in parallel to the optical waveguide is bisected in the longitudinal direction.

48 Claims, 12 Drawing Sheets

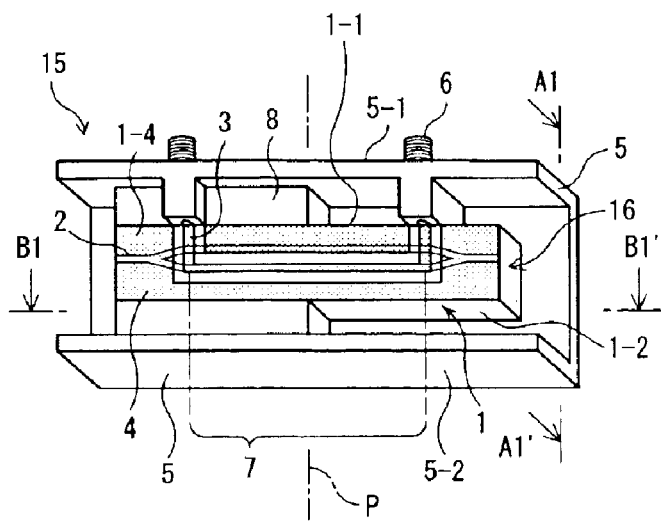
F I G. 1 (a)
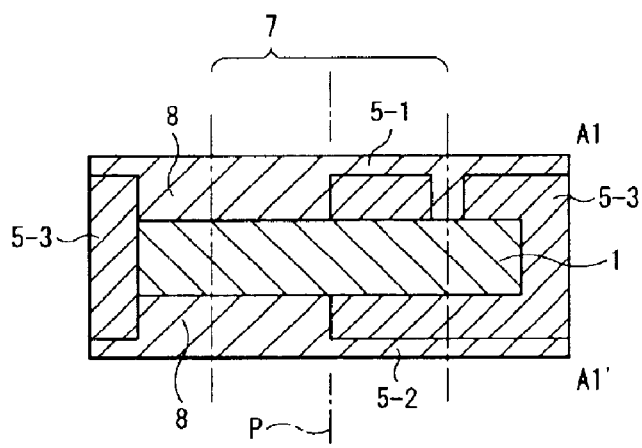
F I G. 1 (b)
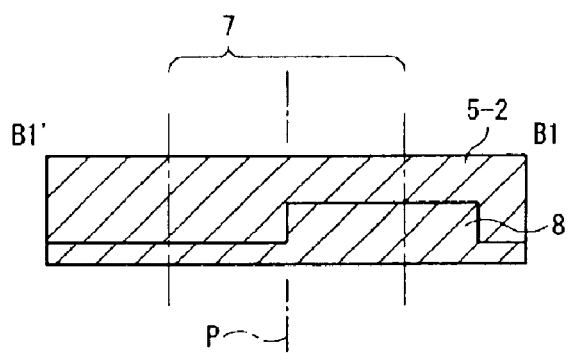
F I G. 1 (c)

F I G. 3 (a)
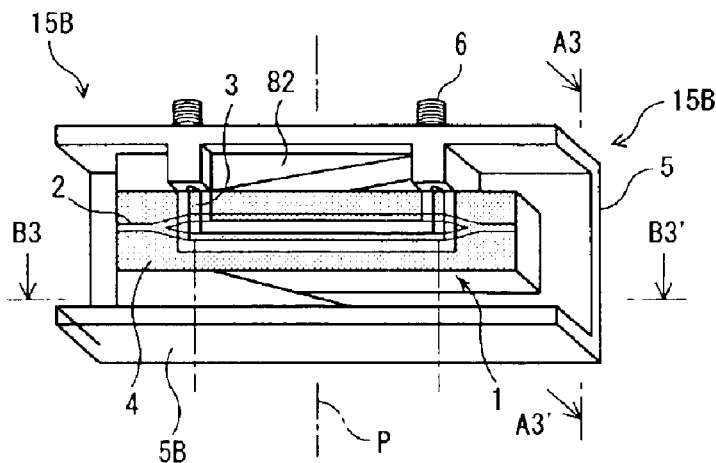
F I G. 3 (b)
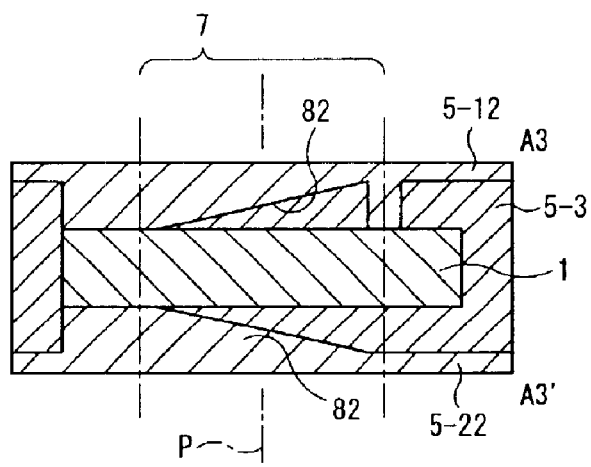
F I G. 3 (c)
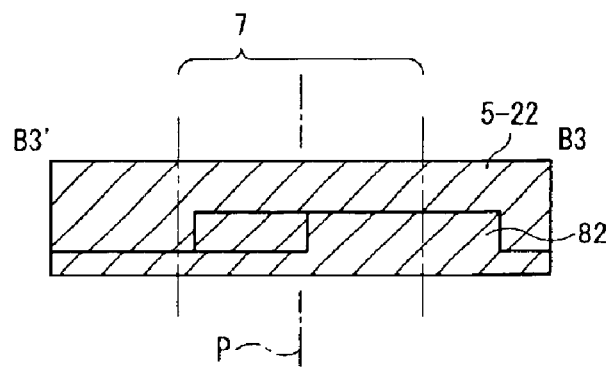

UPSTREAM MIDSTREAM DOWNSTREAM
PORTION PORTION PORTION

→ PROPAGATION DIRECTION OF MICROWAVE

→ PROPAGATION DIRECTION OF MICROWAVE

→ PROPAGATION DIRECTION OF MICROWAVE

F I G. 13
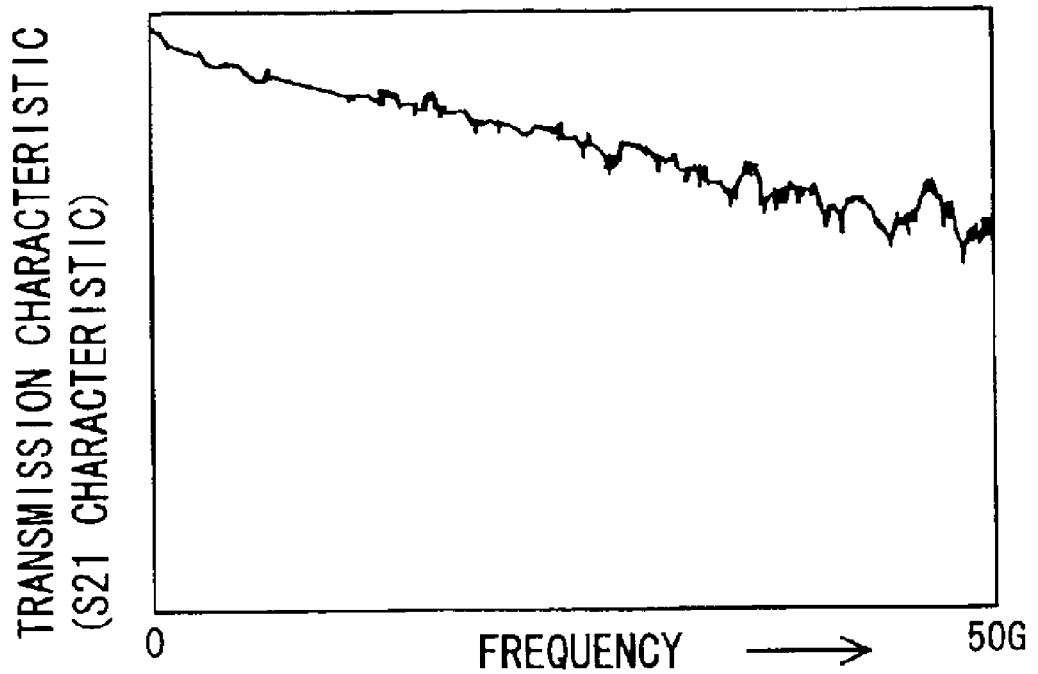

OPTICAL MODULATOR MODULE AND OPTICAL MODULATOR

BACKGROUND OF THE INVENTION

1) Field of the Invention

This invention relates to an optical modulator module and an optical modulator suitable for use with an optical communication system.

2) Description of the Related Art

Conventionally, in optical communication systems, in order to modulate a light signal to be transmitted, an optical waveguide device in which an electro-optical crystal substrate such as a $LiNbO_3$ or $LiTaO_2$ substrate is used is utilized. The optical waveguide device is formed by forming a metal film partly on a crystal substrate and thermally diffusing the metal film into the crystal substrate or performing proton exchange in benzoic acid after patterning of the metal film to form an optical waveguide and then forming an electrode in the proximity of the optical waveguide.

FIGS. 14(a) and 14(b) are schematic views showing a conventional Mach-Zehnder type optical modulator 106 formed using Z-cut $LiNbO_3$, and particularly, FIG. 14(a) is a top plan view of the Mach-Zehnder type optical modulator 106 and FIG. 14(b) is a sectional view taken along line A–A' of FIG. 14(a). The optical modulator 106 shown in FIGS. 14(a) and 14(b) includes a $LiNbO_3$ substrate 101, an optical waveguide 102, a signal electrode 103 and a ground electrode 104.

The optical waveguide 102 is of the Mach-Zehnder type formed from an incoming waveguide 102a, two parallel waveguides 102b and 102c, and an outgoing waveguide 102d. As shown in FIG. 14(b), the signal electrode 103 is arranged just above the parallel waveguide 102b in order to utilize a refractivity variation by an electric field in the Z-direction. The ground electrode 104 is formed in a predetermined spaced relationship from and along outer edges of the signal electrode 103 over the overall substrate face on which the optical waveguide 101 is formed.

It is to be noted that, in FIG. 14(b), reference numeral 105 denotes a buffer layer. The buffer layer 105 is layered between the substrate 101 and the signal electrode 103 and ground electrode 104 in order to prevent a phenomenon that light which propagates in the parallel waveguides 102b and 102c is absorbed by the signal electrode 103 and the ground electrode 104.

The optical modulator can be applied as such an optical modulator module 100 as, for example, shown in FIG. 15 to a practical communication system. In the optical modulator module 100 of FIG. 15, the substrate 101 is mounted on a housing 107. Inner walls 109 of the housing 107 partly extend inwardly from and are formed integrally with the housing 107 in such a manner as to uniformly sandwich side longitudinal faces with respect to a face of the substrate 101 on which the optical waveguide 102 is formed.

Further, reference numeral 108 denotes a connector connected to the signal electrode 103 for supplying an input signal from the outside to the signal electrode 103. Where the optical modulator 106 is driven at a high rate, one end of the signal electrode 103 as an output terminal and a terminal end of the ground electrode 104 are connected to each other through a resistor R to form a progressive wave electrode, and a microwave signal is applied from the other end of the signal electrode 103 serving as an input terminal.

Thus, the refractivity of the optical waveguide 102 varies like +Δn and −Δn in response to an electric field variation by the microwave signal applied to the signal electrode 103, and thereupon, the phase difference between the parallel waveguides 102b and 102c varies. As a result, modulated signal light can be outputted from the outgoing waveguide 102d.

However, in the conventional optical modulator module and optical modulator 100 having such a configuration as described above, if a high-frequency signal is applied to the progressive wave electrode, then a microwave having a certain frequency resonates in the substrate 101. Therefore, there is a subject that such a dip 110 as seen in FIG. 16 appears in a frequency characteristic (S21 characteristic) of the microwave which propagates in the signal electrode 103 and degrades the light response characteristic.

Conventionally, in order to suppress the dip, several methods have been proposed including a method wherein the thickness or the width of the substrate is reduced or a groove is formed on the rear face of the substrate (refer to Japanese Patent Laid-Open No. 241115/1993) and another method wherein the substrate is formed such that the shape of a cross section thereof varies in a longitudinal direction (refer to Japanese Patent Laid-Open No. 128623/1995). However, in the methods just described, since the substrate itself is worked, the mechanical strength thereof is reduced. Therefore, the methods have subjects to be solved in that handling of the substrate becomes difficult and that the long-term reliability is degraded.

SUMMARY OF THE INVENTION

It is an object of the present invention to provide an optical modulator module and an optical modulator by which a dip appearing in a frequency characteristic of a microwave from a DC component to a high-frequency component can be reduced while maintaining the mechanical strength and facilitating handling of a substrate and besides securing the long-term reliability without processing the substrate itself.

In order to attain the object described above, according to an aspect of the present invention, there is provided an optical modulator module, comprising a substrate having an electro-optical effect, an optical modulator including an optical waveguide formed on a surface of the substrate, a signal electrode formed in the proximity of the optical waveguide and including a portion extending in parallel to the optical waveguide for applying an electric signal, and a ground electrode for applying a ground potential, and a housing in and to which the optical modulator is accommodated and secured, the shape of a longitudinal section of the other portion of the optical modulator module than the substrate being asymmetrical with respect to a perpendicular line with which the portion of the signal electrode which extends in parallel to the optical waveguide is bisected in the longitudinal direction. The configuration of the optical modulator module reduces a dip which appears with a frequency characteristic of a microwave when the microwave propagates along the electrode.

Preferably, the shape of a longitudinal section of the housing is asymmetrical with respect to the perpendicular line.

The shape of the longitudinal sections of side walls, which oppose side longitudinal faces of the substrate with respect to a plane of the optical waveguide, of the housing parallel to the plane of the optical waveguide or perpendicular to the plane of the optical waveguide may be asymmetrical with respect to the perpendicular line.

The housing may include a housing body in and to which the optical modulator is accommodated and secured and a lid element for covering the housing body, and the shape of the longitudinal section of the lid element parallel to a plane of the optical waveguide or perpendicular to the plane of the optical waveguide may be asymmetrical with respect to the perpendicular line.

The shape of the longitudinal section of a bottom wall, which opposes a rear face of the substrate with respect to a plane of the optical waveguide, of the housing parallel to the plane of the optical waveguide or perpendicular to the plane of the optical waveguide may be asymmetrical with respect to the perpendicular line.

Preferably, the opposite side portions of the housing which oppose the opposite side longitudinal faces of the substrate with respect to a plane of the optical waveguide are located at positions symmetrical with each other with respect to the substrate.

An inner face of the housing is formed partly or entirely from a metal, a magnetic material or a dielectric material.

A film may be formed at part of a side longitudinal face of the substrate with respect to a plane of the optical waveguide such that the shape of a section thereof parallel to the side longitudinal face of the substrate varies in the longitudinal direction, or a film may be formed at part of a rear face of the substrate with respect to a plane of the optical waveguide such that the shape of a section thereof parallel to the rear face of the substrate varies in the longitudinal direction.

In this instance, the film may be made of a metal, a magnetic material or a dielectric material. A gap may be provided between the film and an inner face of the housing. The film and an inner face of the housing may be made of different materials from each other.

Preferably, the shape of a section of the ground electrode parallel to a plane of the optical waveguide varies in the longitudinal direction. The shape of the section may vary continuously in the longitudinal direction. Alternatively, the shape of the section may vary stepwise in the longitudinal direction. In this instance, the shape of the section may vary stepwise in a plurality of stages in the longitudinal direction.

According to another aspect of the present invention, there is provided an optical modulator, comprising a substrate having an electro-optical effect, an optical waveguide formed on a surface of the substrate, and a signal electrode formed in the proximity of the optical waveguide and including a portion extending in parallel to the optical waveguide for applying an electric signal and a ground electrode for applying a ground potential, a film being formed at part of a side longitudinal face or a rear face of the substrate with respect to a plane of the optical waveguide such that the shape of a section of the film parallel to the side longitudinal face or the rear face of the substrate varies in a longitudinal direction of the substrate. Also the configuration of the optical modulator module reduces a dip which appears with a frequency characteristic of a microwave when the microwave propagates along the electrode.

According to a further aspect of the present invention, there is provided an optical modulator, comprising a substrate having an electro-optical effect, an optical waveguide formed on a surface of the substrate, and a signal electrode formed in the proximity of the optical waveguide and including a portion extending in parallel to the optical waveguide for applying an electric signal and a ground electrode for applying a ground potential, the shape of a section of the ground electrode parallel to a plane of the optical waveguide varying in a longitudinal direction of the substrate. Also the configuration of the optical modulator module reduces a dip which appears with a frequency characteristic of a microwave when the microwave propagates along the electrode.

According to a still further aspect of the present invention, there is provided an optical modulator, comprising a substrate having an electro-optical effect, an optical waveguide formed on a surface of the substrate, and a signal electrode formed in the proximity of the optical waveguide and including a portion extending in parallel to the optical waveguide for applying an electric signal and a ground electrode for applying a ground potential, an end portion which forms a major side of the surface of the substrate on which the optical waveguide is formed being formed as an area in which none of the optical waveguide, the signal electrode and the ground electrode is formed. Also the configuration of the optical modulator module reduces a dip which appears with a frequency characteristic of a microwave when the microwave propagates along the electrode.

The width of the end portion of the surface of the substrate may be greater than one half the overall width of the substrate. One end portions of the signal electrode and the ground electrode may partition the end portion of the substrate into two areas.

In summary, the optical modulator module and the optical modulators are advantageous in that a dip appearing in a frequency characteristic of a microwave from a DC component to a high-frequency component can be reduced while maintaining the mechanical strength and facilitating handling of a substrate and besides securing the long-term reliability without working the substrate itself such as to form a groove.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1(a) to 1(c) are schematic views showing an optical modulator module according to a first embodiment of the present invention;

FIGS. 3(a) to 3(c) are schematic views showing an optical modulator module according to a second modification to the first embodiment of the present invention;

FIG. 13 is a diagram illustrating an effect by the optical modulator module and the optical modulator according to the embodiments of the present invention;

DESCRIPTION OF THE PREFERRED EMBODIMENTS

Figure 2A:
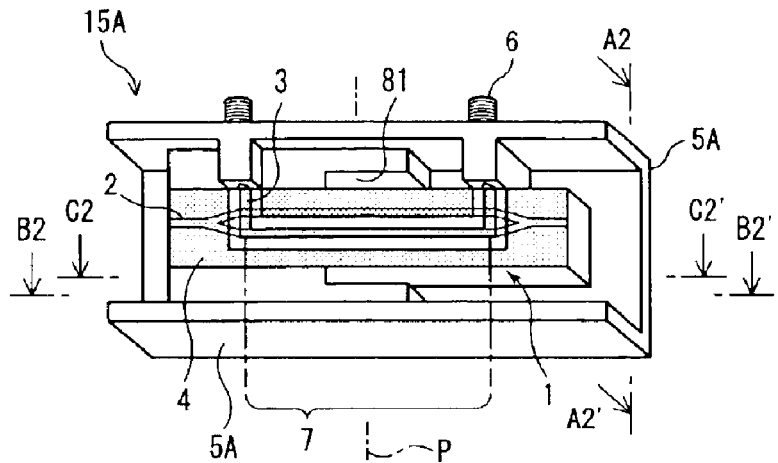
FIGS. 2(a) to 2(d) are schematic views showing an optical modulator module according to a first modification to the first embodiment of the present invention.

In the following, embodiments of the present invention are described with reference to the drawings.

[1] Description of the First Embodiment of the Invention

FIGS. 1(a) to 1(c) are schematic views showing an optical modulator module according to a first embodiment of the present invention, and specifically, FIG. 1(a) is a perspective view particularly showing an optical modulator formation face of the optical modulator module; FIG. 1(b) is a sectional view taken along line A1–A1' of FIG. 1(a); and FIG. 1(c) is a sectional view take along line B1–B1' of FIG. 1(a).

Referring first to FIG. 1(a), reference numeral 15 denotes an optical modulator module. The optical modulator module 15 has an optical modulator 16 and a housing 5 for accommodating and securing the optical modulator 16 in the inside thereof. The optical modulator 16 is provided for modulating a light signal to be transmitted and includes a substrate 1 having an electro-optical effect, a Mach-Zehnder type optical waveguide 2 formed on a surface of the substrate 1, a signal electrode 3, and a ground electrode 4.

Here, the housing 5 having a U-shaped channel-like cross section shown in FIG. 1(a) includes a pair of side walls 5-1 and 5-2 facing side longitudinal faces 1-1 and 1-2 of the substrate 1, respectively, and a bottom wall 5-3 facing a rear face (a face opposite to the optical waveguide face) of the substrate 1. The walls 5-1, 5-2 and 5-3 are integrally formed from a material such as brass. The signal electrode 3 is formed including a portion extending in parallel to the optical waveguide 2 in the proximity of the optical waveguide 2, and receives an electric signal to be applied from the outside through a connector 6. The ground electrode 4 is formed in an overall area on the optical waveguide face 1-4 of the substrate 1 except the signal electrode 3 and an area within a range of a predetermined distance from the signal electrode 3, and is connected to the grounded housing 5.

Figure 14A:
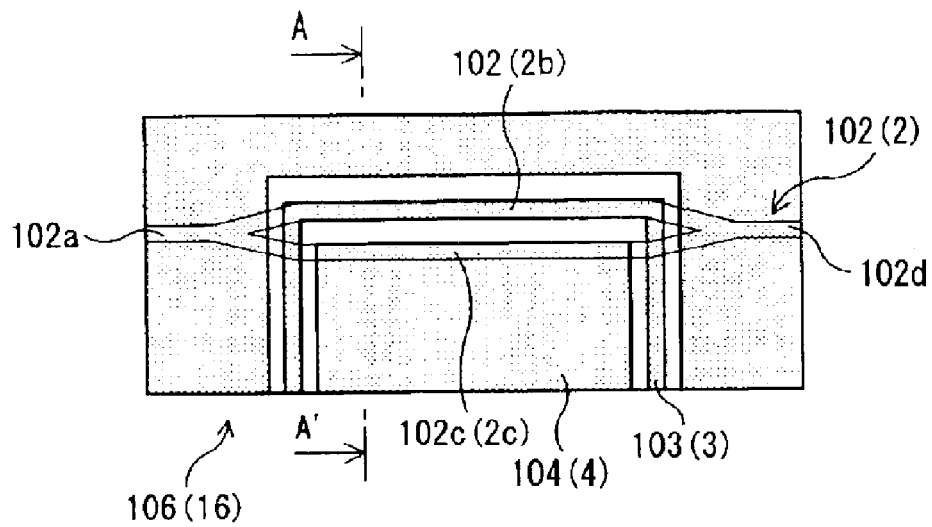
FIGS. 14(a) and 14(b) are schematic views showing a convention optical modulator.

In particular, for example, on the substrate 1 cut in vertical to the Z-axis of the crystal orientation, the signal electrode 3 is formed so as to cover an upper portion of one of branched parallel waveguide portions (refer to reference character 102b of FIG. 14(a)) which form the Mach-Zehnder type optical waveguide 2. Consequently, when an electric signal of a microwave is supplied from the outside through the connector 6 described above, the signal electrode 3 can provide an interaction with the light propagating in the optical waveguide 2, that is, an electric field variation for polarizing the light.

In other words, the light to which the interaction described above has been applied from the signal electrode 3 extending in parallel to the optical waveguide 2 along one of the branched parallel waveguides of the optical waveguide 2 and the other light which has not been polarized by an electric field variation can be multiplexed at a joining point [refer to reference character 102d of FIG. 14(a)] of the optical waveguide 2 to produce a modulated light signal.

Now, a structure of the side walls 5-1 and 5-2 of the housing 5 which is a characteristic structure of the present invention is described. Here, FIG. 1(b) shows the shape of the optical modulator module along the A1–A1' section (which is a longitudinal section parallel to the optical waveguide face), and FIG. 1(c) shows the shape of the optical modulator module along the B1–B1' section (which is a longitudinal section perpendicular to the optical waveguide face).

Here, for example, as seen in FIG. 1(b), the optical modulator module 15 is formed such that the shape along the A1–A1' section as the longitudinal section of the components (in the first embodiment, the side walls 5-1 and 5-2 of the housing 5) which form the optical modulator module 15 other than the substrate 1 are asymmetrical with respect to a perpendicular line P in FIG. 1(b). It is to be noted that, the perpendicular line P is a bisector in a longitudinal direction to an interaction portion 7 as a substrate area wherein the signal electrode 3 extends in parallel to the optical waveguide 2.

In particular, as seen in FIG. 1(b), the shape of the longitudinal section (A1–A1' section), parallel to the optical waveguide face 1-4, of the side walls 5-1 and 5-2 facing the side longitudinal faces 1-1 and 1-2 of the substrate 1, respectively, with respect to the optical waveguide face 1-4 is formed in an asymmetrical relationship with respect to the perpendicular line P. In particular, as shown in FIG. 1(b) or FIG. 1(c), left side portions of the side walls 5-1 and 5-2 with respect to the perpendicular line P project to the inner side of the housing 5 in comparison with right side portions of the side walls 5-1 and 5-2 with respect to the perpendicular line P in such a manner as to form projecting portions 8 having an increased thickness.

In this instance, while, in the shape of the A1–A1' section of the side walls 5-1 and 5-2, the side walls 5-1 and 5-2 contact at the projecting portions 8 thereof on the left side with respect to the perpendicular line P in FIGS. 1(a) and 1(b) with the side longitudinal faces 1-1 and 1-2 of the substrate 1, respectively, the side walls 5-1 and 5-2 do not contact at the right side portions thereof with respect to the perpendicular line P with the side longitudinal faces 1-1 and 1-2 of the substrate 1, respectively. Consequently, a non-flat inner face configuration, that is, a distribution or a variation in shape, is given to the opposite side walls 5-1 and 5-2 of the housing 5.

It is to be noted that, as seen from the A1–A1' section shown in FIG. 1(b), the projecting portions 8 of the opposite side walls 5-1 and 5-2 are arranged such that they are symmetrical in terms of the position and shape with respect to the substrate 1. Further, the projecting portions 8 of the-opposite side walls 5-1 and 5-2 are formed so as to have a substantially equal height to that of the optical waveguide face on the substrate 1.

It is to be noted that, in the optical modulator module 15 of the present embodiment, where it is mounted actually, a lid member not shown for covering the housing 5 described above may be provided.

In the optical modulator module 15 according to the first embodiment of the present invention having the configuration described above, a non-flat inner face configuration, that is, a distribution or a variation in shape, is given to the opposite side walls 5-1 and 5-2 of the housing 5 as shown in FIGS. 1(a) to 1(c). Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, with the optical modulator module 15 according to the first embodiment of the present invention, there are advantages that, due to the characteristic configuration of the side walls 5-1 and 5-2, the mechanical strength is maintained without working the substrate itself and the long-term reliability is secured while handling of the substrate is facilitated, and that a dip appearing in a frequency characteristic of a microwave from a DC component to a high-frequency component can be reduced.

[1-1] Description of the First Modification to the First Embodiment

FIGS. 2(a) to 2(d) are schematic views showing an optical modulator module according to a first modification to the first embodiment of the present invention. While the optical modulator module 15A shown in FIGS. 2(a) to 2(d) is different from the optical modulator module 15 according to the first embodiment described above [refer to FIGS. 1(a) to 1(c)] in that the opposite side walls 5-11 and 5-21 of a housing 5A have projecting portions 81 having a structure different from that in the first embodiment described above, it is similar in the other configuration particulars such as a configuration that the side walls 5-11 and 5-21 of the housing 5A are formed so as to have an asymmetrical configuration with respect to the perpendicular line P.

Figure 2B:
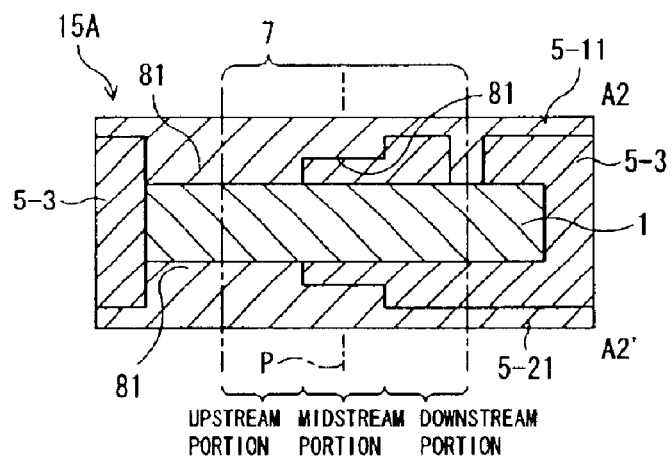
Figure 2C:
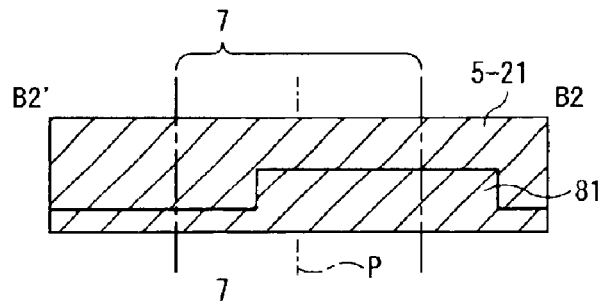
Figure 2D:
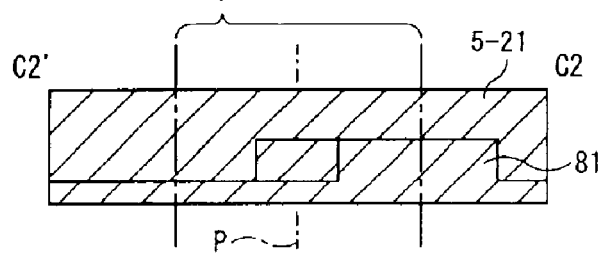

Here, FIG. 2(a) is a perspective view particularly showing an optical waveguide formation face of the optical modulator module 15A according to the present modification; FIG. 2(b) shows the shape of an A2–A2' section (a longitudinal section parallel to the optical waveguide face) of FIG. 2(a); FIG. 2(c) shows the shape of a B2–B2' section (a longitudinal section perpendicular to the optical waveguide face) of FIG. 2(a); and FIG. 2(d) shows the shape of a C2–C2' section (a longitudinal section perpendicular to the optical waveguide face) of FIG. 2(a). It is to be noted that, in FIGS. 2(a) to 2(d), substantially like elements to those of FIGS. 1(a) to 1(c) are denoted by like reference characters.

In particular, as shown in FIGS. 2(a) to 2(d), the side walls 5-11 and 5-21 having the projecting portions 81 are configured such that the thickness thereof varies stepwise in a plurality of stages (three stages in FIGS. 2(a) and 2(b)) in the longitudinal direction. In the present case, the sidewalls 5-11 and 5-21 are configured such that the thickness thereof decreases stepwise in three stages along a propagation direction of a microwave propagating along the signal electrode 3 and besides the side walls 5-11 and 5-21 are spaced away from the substrate 1.

In other words, the spaces between the side walls 5-11 and 5-21 and the side longitudinal faces of the substrate 1 increase stepwise along the propagation direction of the microwave propagating along the signal electrode 3 at equal distances equal to one third the length of the interaction portion 7 in the longitudinal direction. At this time, while the side walls 5-11 and 5-21 and the substrate 1 contact with each other at a position at an upstream side portion of the microwave, the spaces between the side walls 5-11 and 5-21 and the substrate 1 vary stepwise in three stages from a midstream portion to a downstream portion of the microwave. Consequently, a non-flat inner face configuration, that is, a distribution or a variation in shape, is given to the opposite side walls 5-11 and 5-21 of the housing 5A.

It is to be noted that, as seen from the A2–A2' section shown in FIG. 2(b), the projecting portions 81 of the opposite side walls 5-11 and 5-21 are arranged such that they are symmetrical in position and shape with respect to the substrate 1. Further, the projecting portions 81 of the opposite side walls 5-11 and 5-21 are formed so as to have a substantially equal height to that of the optical waveguide face on the substrate 1.

In the optical modulator module 15A according to the first modification to the first embodiment of the present invention having the configuration described above, a non-flat inner face configuration, that is, a distribution or a variation in shape, is given to the opposite side walls 5-11 and 5-21 of the housing 5A as shown in FIGS. 2(a) to 2(d). Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, also in the first modification to the first embodiment of the present invention, similarly as in the first embodiment described above, there are advantages that, due to the characteristic configuration of the side walls 5-11 and 5-21, the mechanical strength is maintained without working the substrate itself and the long-term reliability is secured while handling of the substrate is facilitated, and that a dip appearing in a frequency characteristic of a microwave from a DC component to a high-frequency component can be reduced.

[1-2] Description of the Second Modification to the First Embodiment

FIGS. 3(a) to 3(c) are schematic views showing an optical modulator module according to a second modification to the first embodiment of the present invention. While the optical modulator module 15B shown in FIGS. 3(a) to 3(c) is different from the optical modulator module 15B according to the first embodiment described above [refer to FIGS. 1(a) to 1(c)] in that the opposite side walls 5-12 and 5-22 of a housing 5B have projecting portions 82 having a structure different from that in the first embodiment described above, it is similar in the other configuration particulars such as a configuration that the side walls 5-12 and 5-22 of the housing 5B are configured so as to have an asymmetrical configuration with respect to the perpendicular line P.

Here, FIG. 3(a) is a perspective view particularly showing a formation face for an optical waveguide of the optical modulator module 15B according to the present modification; FIG. 3(b) shows the shape of an A3–A3' section (a longitudinal section parallel to the optical waveguide face) of FIG. 3(a); and FIG. 3(c) shows the shape of a B3–B3' section (a longitudinal section perpendicular to the optical waveguide face) of FIG. 3(a). It is to be noted that, in FIGS. 3(a) to 3(c), substantially like elements to those of FIGS. 1(a) to 1(c) are denoted by like reference characters.

In particular, as shown in FIGS. 3(a) to 3(c), the side walls 5-12 and 5-22 having the projecting portions 82 are configured such that the thickness thereof continuously varies in the longitudinal direction. In the present case, the side walls 5-12 and 5-22 are configured such that the thickness thereof decreases continuously along a propagation direction of a microwave propagating along the signal electrode 3 and besides the projecting portions 82 are spaced away from the substrate 1.

In other words, while the side walls 5-12 and 5-22 and the substrate 1 contact with each other at a position of an upstream side portion of the microwave, the spaces between the side walls 5-12 and 5-22 and the substrate 1 increase continuously (gradually) from a midstream portion to a downstream portion of the microwave. Consequently, a non-flat inner face configuration, that is, a distribution or a variation in shape, is given to the opposite side walls 5-12 and 5-22 of the housing 5B.

It is to be noted that, as seen from the A3–A3' section shown in FIG. 3(b), the projecting portions 82 of the opposite side walls 5-12 and 5-22 are arranged such that they are symmetrical in position and shape with respect to the substrate 1. Further, the projecting portions 82 of the side walls 5-12 and 5-22 described above are formed so as to have a substantially equal height to that of the optical waveguide face on the substrate 1.

In the optical modulator module 15B according to the second modification to the first embodiment of the present invention having the configuration described above, a non-flat inner face configuration, that is, a distribution or a variation in shape, is given to the opposite side walls 5-12 and 5-22 of the housing 5B as shown in FIGS. 3(a) to 3(c). Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, also in the second modification to the first embodiment of the present invention, there are advantages that, due to the characteristic configuration of the side walls 5-12 and 5-22, the mechanical strength is maintained without working the substrate 1 itself and the long-term reliability is secured while handling of the substrate 1 is facilitated, and that a dip appearing in a frequency characteristic of a microwave from a DC component to a high-frequency component can be reduced.

[1-3] Description of the Third Modification to the First Embodiment

Figure 4:
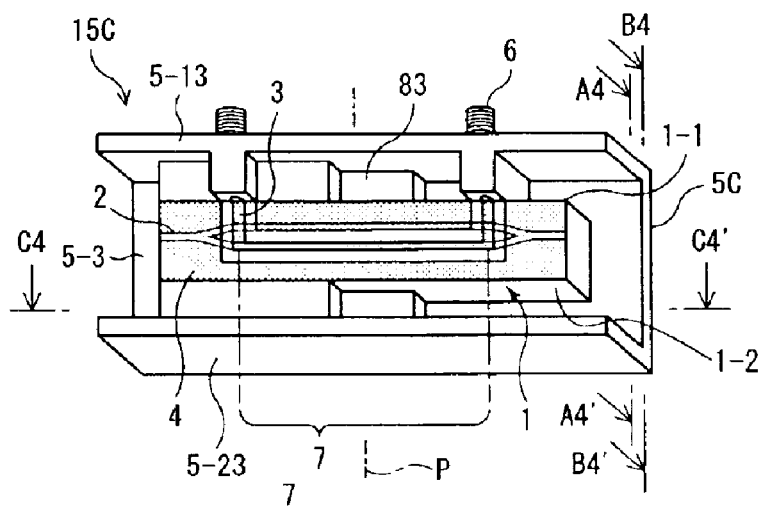
FIGS. 4(a) to 4(d) are schematic views showing an optical modulator module according to a third modification to the first embodiment of the present invention.
Figure 4:
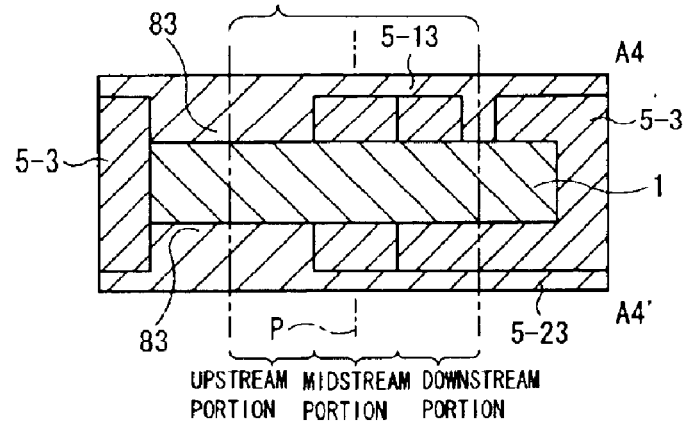
Figure 4:
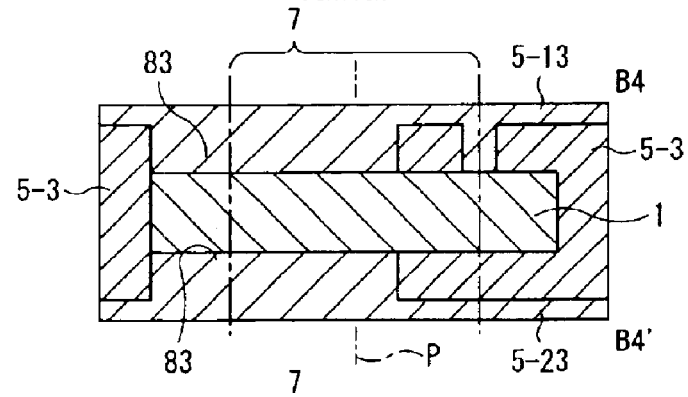
Figure 4:
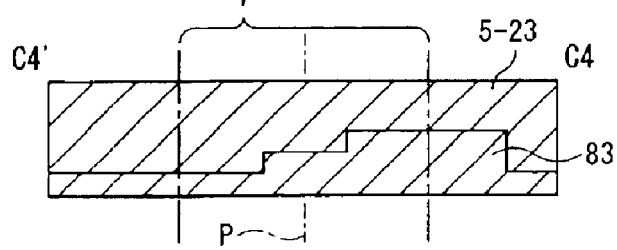

FIGS. 4(a) to 4(d) are schematic views showing an optical modulator module according to a third modification to the first embodiment of the present invention, and specifically, FIG. 4(a) is a perspective view particularly showing a formation face for an optical waveguide of the optical modulator module; FIG. 4(b) is a sectional view taken along line A4–A4' of FIG. 4(a) (a longitudinal section parallel to the optical waveguide face); FIG. 4(c) is a sectional view take along line B4–B4' of FIG. 4(a) (a longitudinal section parallel to the optical waveguide face); and FIG. 4(d) is a sectional view taken along line C4–C4' of FIG. 4(a) (a longitudinal section perpendicular to the optical waveguide face).

While the optical modulator module 15C shown in FIGS. 4(a) to 4(d) is different from the optical modulator module 15 according to the first embodiment described above [refer to FIGS. 1(a) to 1(c)] in that the opposite side walls 5-13 and 5-23 of a housing 5C have projecting portions 83 having a structure different from that in the first embodiment described above, it is similar in the other configuration particulars such as a configuration that the side walls 5-13 and 5-23 of the housing 5C are configured so as to have an asymmetrical configuration with respect to the perpendicular line P. It is to be noted that, in FIGS. 4(a) to 4(d), substantially like elements to those of FIGS. 1(a) to 1(c) are denoted by like reference characters.

In particular, as shown in FIG. 4(d), the optical modulator module 15C is configured such that the shape of a widthwise section of the side walls 5-13 and 5-23, which face the side longitudinal faces 1-1 and 1-2 of the substrate 1, respectively, with respect to the optical waveguide face, perpendicular to the optical waveguide face is asymmetrical with respect to the perpendicular line P. In other words, the projecting portions 83 of the side walls 5-13 and 5-23 are configured such that the height thereof varies stepwise in three stages along a longitudinal direction.

At this time, while the height of the projecting portions 83 and the height of the substrate 1 are substantially equal to each other at a position of an upstream side portion of the microwave, the height of the projecting portions 83 successively decreases stepwise in three stages from a midstream portion to a downstream portion of the microwave. Consequently, a non-flat inner face configuration, that is, a distribution or a variation in shape, is given to the opposite side walls 5-13 and 5-23 of the housing 5C.

It is to be noted that, as seen from the A4–A4' section shown in FIG. 4(b), the projecting portions 83 of the side walls 5-13 and 5-23 are arranged so as to be symmetrical in position and shape with respect to the substrate 1. Further, the projecting portions 83 of the opposite side walls 5-13 and 5-23 described above are configured so as to have a substantially equal height to that of the optical waveguide face on the side longitudinal faces of the substrate 1.

In the optical modulator module 15C according to the third modification to the first embodiment of the present invention having the configuration described above, a non-flat inner face configuration, that is, a distribution or a variation in shape, is given to the opposite side walls 5-13 and 5-23 of the housing SC as shown in FIGS. 4(a) to 4(d). Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, also in the third modification to the first embodiment of the present invention, there are advantages that, due to the characteristic configuration of the side walls 5-13 and 5-23, the mechanical strength is maintained without working the substrate 1 itself and the long-term reliability is secured while handling of the substrate 1 is facilitated, and that a dip appearing in a frequency characteristic of a microwave from a DC component to a high-frequency component can be reduced.

[1-4] Description of the Fourth Modification to the First Embodiment

Figure 5A:
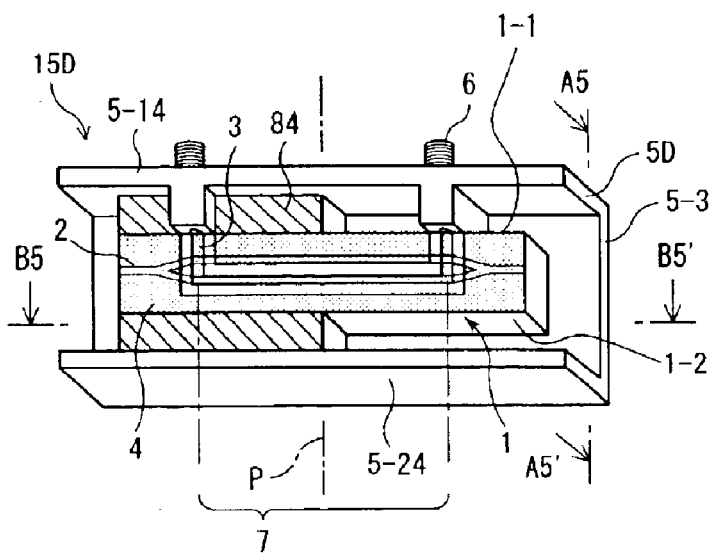
FIGS. 5(a) to 5(c) are schematic views showing an optical modulator module according to a fourth modification to the first embodiment of the present invention.
Figure 5B:
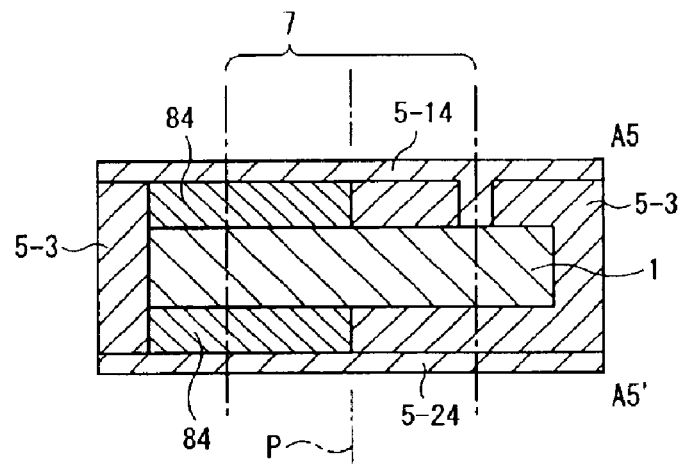
Figure 5C:
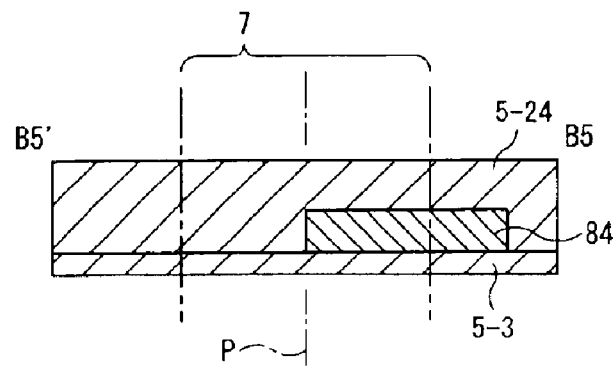

FIGS. 5(a) to 5(c) are schematic views showing an optical modulator module according to a fourth modification to the first embodiment of the present invention. While the optical modulator module 15D shown in FIGS. 5(a) to 5(c) is different from the optical modulator module 15 according to the first embodiment described above [refer to FIGS. 1(a) to 1(c)] in that the opposite side walls 5-14 and 5-24 of a housing 5D have projecting portions 84 having a structure different from that in the first embodiment described above, it is similar in the other configuration particulars such as a configuration that the side walls 5-14 and 5-24 of the housing 5D are configured so as to be asymmetrical with respect to the perpendicular line P.

Here, FIG. 5(*a*) is a perspective view particularly showing a formation face for an optical waveguide of the optical modulator module 15D according to the present modification; FIG. 5(*b*) shows the shape of an A5–A5' section (a longitudinal section parallel to the-optical waveguide face) of FIG. 5(*a*); and FIG. 5(*c*) shows the shape of a B5–B5' section (a longitudinal section perpendicular to the optical waveguide face) of FIG. 5(*a*). It is to be noted that, in FIGS. 5(*a*) to 5(*c*), substantially like elements to those of FIGS. 1(*a*) to 1(*c*) are denoted by like reference characters.

Further, while the projecting portions 84 in the fourth embodiment are different from the projecting portions 8 of the first embodiment in that they are formed not from a metal but from a magnetic material, they are similar to the projecting portions 8 in that left side portions of the side walls 5-14 and 5-24 with respect to the perpendicular line P described above project to the inner side of the housing 5 when compared with right side portions of the side walls 5-14 and 5-24 with respect to the perpendicular line P in such a manner as to form the projecting portions 84 having an increased thickness.

In the present case, while, in the shape of the A5–A5' section of the side walls 5-14 and 5-24 in FIGS. 5(*a*) and 5(*b*), the projecting portions 84 of the side walls 5-14 and 5-24 contact with the side longitudinal faces 1-1 and 1-2 of the substrate 1, respectively. Consequently, a non-flat inner face configuration, that is, a distribution or a variation in shape, is given to the opposite side walls 5-14 and 5-24 of the housing 5.

It is to be noted that, as seen from the A5–A5' section shown in FIG. 5(*b*), the projecting portions 84 of the opposite side walls 5-14 and 5-24 are arranged such that they are symmetrical in position and shape with respect to the substrate 1. Further, the projecting portions 84 of the opposite side walls 5-14 and 5-24 described above are formed so as to have a substantially equal height to that of the optical waveguide face on the substrate 1.

In the optical modulator module 15D according to the fourth modification to the first embodiment of the present invention having the configuration described above, a non-flat inner face configuration, that is, a distribution or a variation in shape, is given to the opposite side walls 5-14 and 5-24 of the housing 5D as shown in FIGS. 5(*a*) to 5(*c*). Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, also in the fourth modification to the first embodiment of the present invention, there are advantages that, due to the characteristic configuration of the side walls 5-14 and 5-24, the mechanical strength is maintained without working the substrate 1 itself and the long-term reliability is secured while handling of the substrate 1 is facilitated, and that a dip appearing in a frequency characteristic of a microwave from a DC component to a high-frequency component can be reduced.

[1-5] Description of the Production Method of the Optical Modulator Applicable to the First to Fourth Embodiments The optical modulators 16 and 106 applicable to the first embodiment and the modifications thereto described above and second to fourth embodiments hereinafter described of the present invention are formed by a process described below basically similarly to the optical modulator of FIG. 14 described hereinabove. It is to be noted that, in optical modulators according to fifth to seventh embodiments, new steps are added to the steps for producing the optical modulators according to the first to fourth embodiments as hereinafter described.

In the following, an example of the production method of the optical modulator applicable to the first to fourth embodiments is described generally with reference to FIGS. 14(*a*) and 14(*b*).

Mirror polishing is performed for a surface of, for example, a plate of $LiNbO_3$ (lithium niobate) of proximately 40 mm long, 2 mm wide and 1 mm thick to form the substrate 1. Then, Ti (titanium) vacuum deposited to a thickness of, for example, approximately 100 nm is processed by a known photo-etching method so as to leave a portion corresponding to the optical waveguide, and the Ti is heated for approximately 10 hours at a temperature of, for example, approximately 1050° C. to thermally diffuse the Ti into the $LiNbO_3$ to form the optical waveguides 2*b* and 2*c*.

Then, in order to produce the buffer layer 14 [refer to FIG. 14(*b*)], for example, a $SiO_2$ film is vacuum deposited to a thickness of approximately 500 nm, and then Au of a thickness of, for example, 150 nm is vapor deposited as a metal ground layer on the $SiO_2$ film. Further, the metal ground layer deposited on the $SiO_2$ film is removed by a photo-etching method while leaving the formation areas for the signal electrode 3 and the ground electrode 4, a bridge portion connecting the formation areas to each other and a surrounding portion around them.

Thereafter, a resist of a thickness substantially equal to the thickness of the desired signal electrode is formed, for example, by spin coating on the substrate 1 processed in such a manner as described above, and then a known photo-lithography technique is applied to form a resist pattern except the areas in which the signal electrode 3 and the ground electrode 4 are to be formed.

Further, on that portion of the metal ground layer on which the resist pattern formed by such processing as described above is not formed, Au is plated, for example, to such a thickness that it is in level with the top face of the resist pattern thereby to form the signal electrode 3 and the ground electrode 4.

Thereafter, the resist pattern of the substrate 1 is removed with suitable parting agent to form the signal electrode 3 and the ground electrode 4 having desired widths and a desired thickness on the buffer layer 12.

[1-6] Others

It is to be noted that, while, in the first embodiment and the modifications thereto described above, the boundary between the portions at which the side walls 5-1 and 5-2 and 5-11 to 5-14 and 5-21 to 5-24 of the housings 5 and 5A to 5D contact with the side longitudinal faces 1-1 and 1-2 of the substrate 1 and the portions at which the side walls 5-1 and 5-2 and 5-11 to 5-14 and 5-21 to 5-24 of the housings 5 and 5A to 5D do not contact with the side longitudinal faces 1-1 and 1-2 of the substrate 1 is set to the position at which the interaction portion 7 is bisected in the longitudinal direction thereof with the perpendicular line P, the position of the boundary is not limited to this, but may otherwise be displaced leftwardly or rightwardly in FIGS. 1(*b*) to 5(*b*) so that the interaction portion 7 maybe asymmetrical with respect to the perpendicular line P. The modified configuration just described can vary the frequency characteristic of the dip thereby to form the optical modulator modules 15 and 15A to 15C so that a frequency of a microwave can be obtained in response to an electric signal to be applied to the signal electrode 3.

Further, in the first embodiment and the modifications thereto described above, the projecting portions 8 and 81 to 84 of the opposite side walls 5-1 and 5-2 and 5-11 to 5-14 and 5-21 to 5-24 are arranged in such a manner as to be symmetrical in position and shape with respect to the substrate 1. However, the present invention is not limited to the specific configuration but permits such a structure that the projecting portions of the opposite side walls are asymmetrical taking improvement of the frequency characteristic, simplicity and facility in mounting and so forth into consideration.

Furthermore, in the first embodiment and the modifications thereto described above, the projecting portions 8 and 81 to 83 are formed such that the thickness thereof decrease continuously or successively or the height thereof decreases continuously or successively in the propagating direction of the microwave propagating in the signal electrode 3. However, the present invention is not limited to the specific configuration but permits another configuration wherein the thickness or the height of the projecting portions increases continuously or successively in the propagating direction of the microwave propagating in the signal electrode 3.

[2] Description of the Second Embodiment

Figure 6:
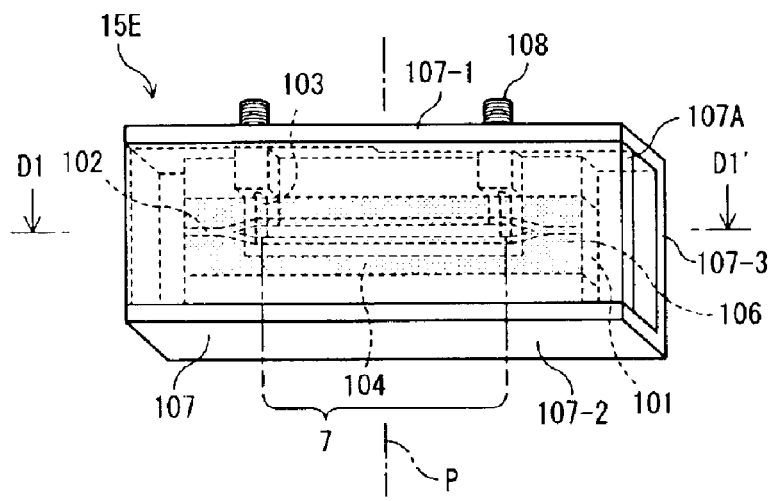
FIGS. 6(a) and 6(b) are schematic views showing an optical modulator module according to a second embodiment of the present invention.
Figure 6:
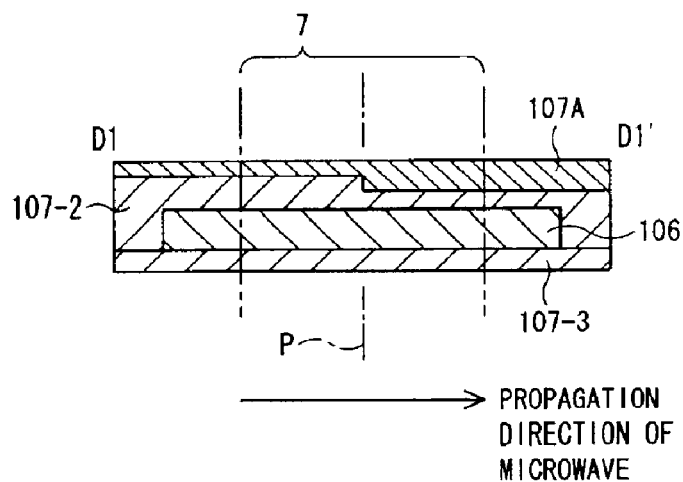

FIGS. 6(a) and 6(b) are schematic views showing an optical modulator module according to a second embodiment of the present invention. While the optical modulator module 15E shown in FIGS. 6(a) and 6(b) is common to the optical modulator module 15 according to the first embodiment described above [refer to FIGS. 1(a) to 1(c)] in that the shape of a longitudinal section of components which form the optical modulator module 15E other than a substrate 101 are asymmetrical with respect to a perpendicular line P, it is different in that not the cross section of side walls 5-11 and 5-21 of a housing 107 but a lid portion 107A is asymmetrical with respect to the perpendicular line P.

Figure 15:
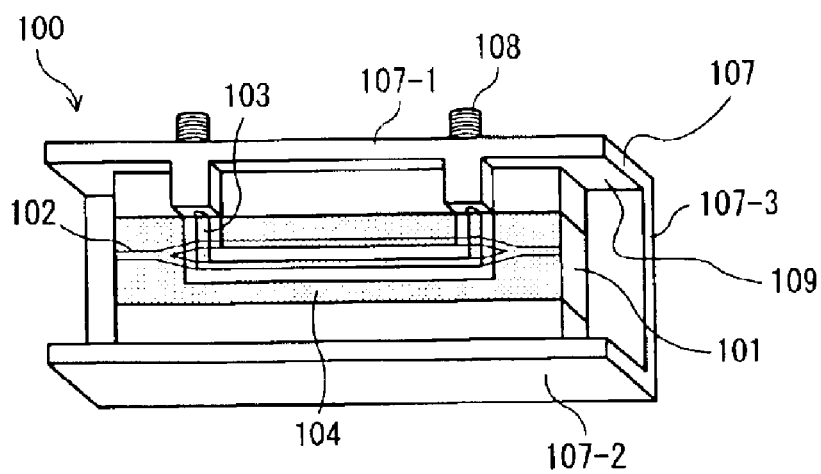
FIG. 15 is a schematic view showing a conventional optical modulator module.
Figure 16:
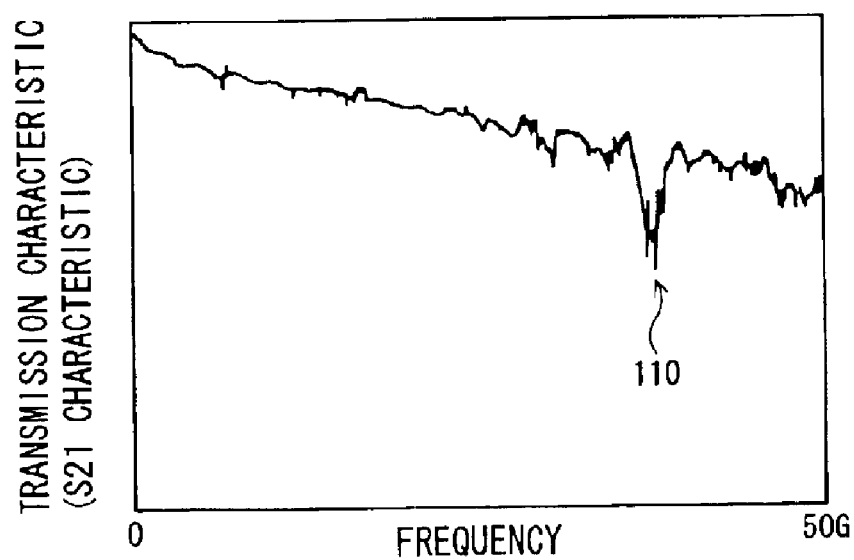
FIG. 16 is a diagram illustrating a subject of the conventional optical modulator module to be solved.

Here, FIG. 6(a) is a perspective view particularly showing a top face of the lid portion, and FIG. 6(b) is a sectional view taken along line D1–D1' of FIG. 6(a) (a longitudinal section perpendicular to an optical waveguide face). It is to be noted that, in FIGS. 6(a) and 6(b), substantially like elements to those of FIG. 15 are denoted by like reference characters.

Figure 14B:
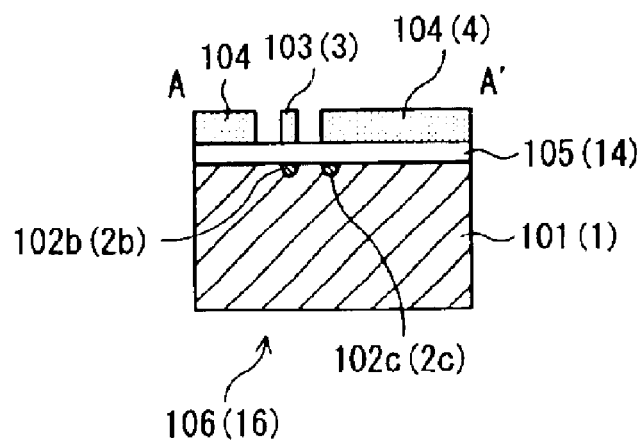

The optical modulator module 15E according to the second embodiment includes an optical modulator 106 similar to that described hereinabove with reference to FIGS. 14(a) and 14(b), and a housing having a housing body 107 for accommodating and securing the optical modulator 106 in the inside thereof and a lid portion 107A for covering the housing body 107.

The lid portion 107A is configured such that the shape of a longitudinal section thereof perpendicular to the optical waveguide face is asymmetrical with respect to the perpendicular line P. In particular, as shown FIG. 6(b), the lid portion 107A is configured such that the thickness thereof varies in the longitudinal direction, or more particularly, varies stepwise in a plurality of stages [two stages in FIGS. 6(a) and 6(b)]. For example, as seen in FIG. 6(b), the lid portion 107A is configured such that the thickness thereof increases stepwise in two stages along a propagation direction of a microwave propagating along the signal electrode 103.

In other words, the space between the lid portion 107A and the optical waveguide face of the substrate 1 decreases stepwise along the propagation direction of the microwave propagating along the signal electrode 103 at distances equal to one half the length of the interaction portion 7 in the longitudinal direction.

In the optical modulator module 15E according to the second embodiment of the present invention having the configuration described above, a non-flat inner face configuration, that is, a distribution or a variation in shape, is given to the lid portion 107A as shown in FIG. 6(b). Consequently, a distribution is provided to the frequency with which resonation occurs with a microwave applied to the signal electrode 103 thereby to prevent appearance of a sharp dip in a particular frequency band as seen, for example, from the frequency number-transparence characteristic (S21 characteristic) of FIG. 13.

In this manner, also in the second embodiment of the present invention, there are advantages that, due to the characteristic configuration of the lid portion 107A, the mechanical strength is maintained without working the substrate itself and the long-term reliability is secured while handling of the substrate is facilitated, and that a dip appearing in a frequency characteristic of a microwave from a DC component to a high-frequency component can be reduced, similarly as in the first embodiment described hereinabove.

It is to be noted that, in the optical modulator module 15E according to the second embodiment described above, the shape of a longitudinal section of the lid portion 107A perpendicular to the optical waveguide face is asymmetrical with respect to the perpendicular line P. However, according to the present invention, the configuration of the lid portion 107A is not limited to the specific configuration, but the lid portion 107A may be configured otherwise such that the shape of a longitudinal section thereof parallel to the optical waveguide face is asymmetrical with respect to the perpendicular line P, for example, in accordance with the shape of the side walls 5-1 and 5-2 described hereinabove with reference to FIGS. 1(a) to 1(c).

[3] Description of the Second Embodiment

Figure 7:
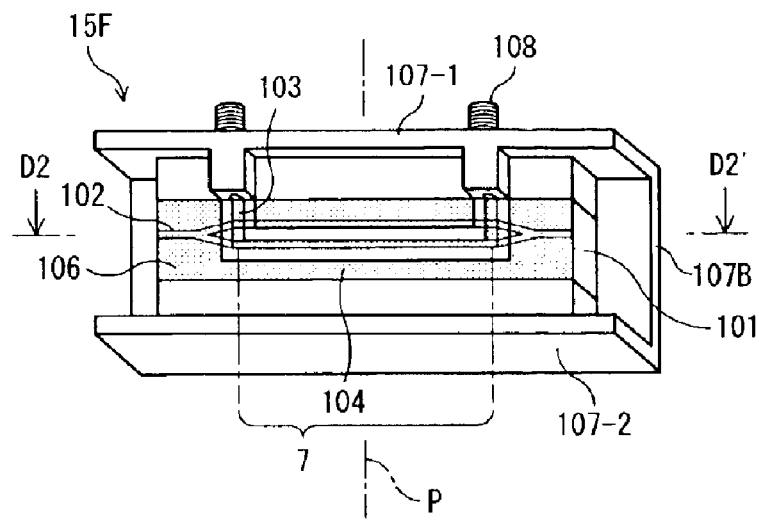
FIGS. 7(a) and 7(b) are schematic views showing an optical modulator module according to a third embodiment of the present invention.
Figure 7:
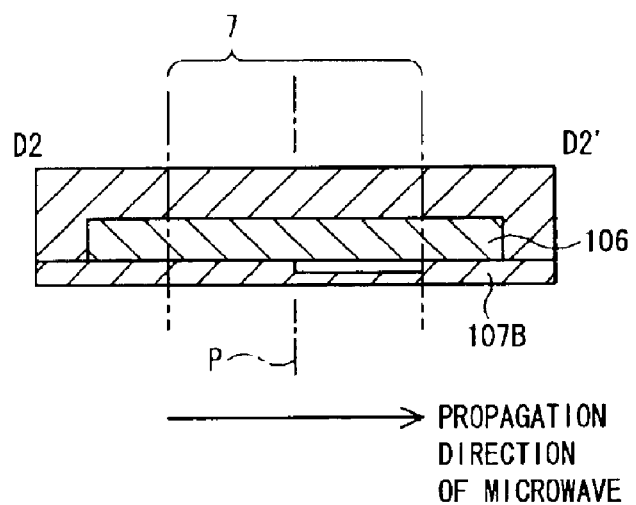

FIGS. 7(a) and 7(b) are schematic views showing an optical modulator module according to a third embodiment of the present invention. While the optical modulator module 15F shown in FIGS. 7(a) and 7(b) is common to the optical modulator module 15 according to the first embodiment described hereinabove [refer to FIGS. 1(a) to 1(c)] in that the shape of a longitudinal section of components which form the optical modulator module 15F other than a substrate 101 are asymmetrical with respect to a perpendicular line P, it is different in that not the thickness of side walls 5-11 and 5-21 of a housing 107 but the thickness of a bottom wall 107B is asymmetrical with respect to the perpendicular line P.

Here, FIG. 7(a) is a perspective view particularly showing the optical waveguide face, and FIG. 7(b) is a sectional view taken along line D2–D2' of FIG. 7(a) (a longitudinal section perpendicular to the optical waveguide face). It is to be noted that the configuration and so forth of the optical modulator 106 which composes the optical modulator module 100 are basically similar to those shown in FIGS. 14(a) and 14(b), and in FIGS. 7(a) and 7(b), substantially like elements to those of FIG. 15 are denoted by like reference characters.

The bottom wall 107B is configured such that the shape of a longitudinal section thereof perpendicular to the optical waveguide face is asymmetrical with respect to the perpendicular line P. In particular, the bottom wall 107B is configured such that the thickness thereof varies stepwise in a plurality of stages [two stages in FIGS. 7(a) and 7(b)] in the longitudinal direction. For example, as seen in FIG. 7(b), the bottom wall 107B is configured such that the thickness thereof increases stepwise in two stages along a propagation direction of a microwave propagating along the signal electrode 103.

In other words, the space between the bottom wall 107B and the opposing bottom face of the substrate 1 decreases stepwise along the propagation direction of the microwave propagating along the signal electrode 103 at distances equal to one half the length of the interaction portion 7 in the longitudinal direction.

In the optical modulator module 15F according to the third embodiment of the present invention having the configuration described above, a non-flat inner face configuration, that is, a distribution or a variation in shape, is given to the bottom wall 107B as shown in FIG. 7(b) Consequently, a distribution is provided to the frequency with which resonation occurs with a microwave applied to the signal electrode 103 thereby to prevent appearance of a sharp dip in a particular frequency band as seen, for example, from the frequency number-transparence characteristic (S21 characteristic) of FIG. 13.

In this manner, also in the third embodiment of the present invention, there are advantages that, due to the characteristic configuration of the bottom wall 107B, the mechanical strength is maintained without working the substrate itself and the long-term reliability is secured while handling of the substrate is facilitated, and that a dip appearing in a frequency characteristic of a microwave from a DC component to a high-frequency component can be reduced, similarly as in the first and second embodiments described hereinabove.

It is to be noted that, in the optical modulator module 15F according to the third embodiment described above, the shape of a longitudinal section of the bottom wall 107B perpendicular to the optical waveguide face is asymmetrical with respect to the perpendicular line P. However, according to the present invention, the configuration of the bottom wall 107B is not limited to the specific configuration, but the bottom wall 107B may be configured otherwise such that the shape of a longitudinal section thereof parallel to the optical waveguide face is asymmetrical with respect to the perpendicular line P, for example, in accordance with the shape of the side walls 5-1 and 5-2 described hereinabove with reference to FIGS. 1(a) to 1(c).

[4] Description of the Fourth Embodiment

Figure 8:
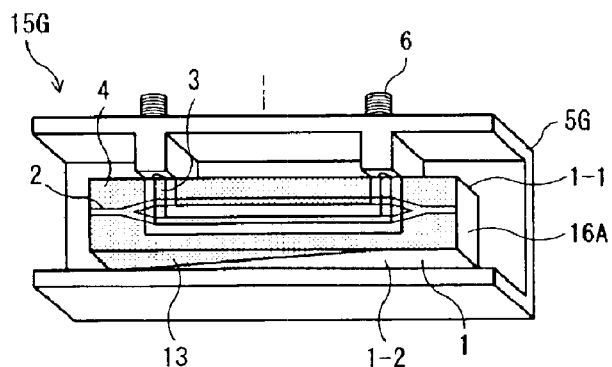
FIG. 8 is a schematic view showing an optical modulator module according to a fourth embodiment of the present invention.

FIG. 8 is a schematic view showing an optical modulator module according to a fourth embodiment of the present invention. While the optical modulator module 15G shown in FIG. 8 is different from the optical modulators according to the embodiments described hereinabove in that the opposite side walls 5-15 and 5-25 of a housing 5G do not have such projecting portions as in the embodiments described hereinabove but instead the optical modulator module 15G includes an optical modulator 16A different from those in the embodiments described hereinabove. It is to be noted that, in FIG. 8, substantially like elements to those of FIGS. 1(a) to 7(b) are denoted by like reference characters.

The optical modulator 16A applied to the optical modulator module 15G according to the fourth embodiment is produced by adding, to the process for producing the optical modulator 16 in the first to third embodiments described hereinabove, a step of vapor depositing a metal film 13 of, for example, Au (gold) at part of the longitudinal side walls 1-1 and 102 of the substrate 1.

Further, the metal film 13 shown in FIG. 8 is formed in a pattern whose width continuously varies in the longitudinal direction of the substrate 1. More particularly, the film 13 is formed at part of the side longitudinal faces 1-1 and 1-2 with respect to the optical waveguide face of the substrate 1 such that the shape of a section thereof parallel to the side longitudinal faces 1-1 and 1-2 varies in the longitudinal direction of the substrate 1.

In other words, the film 13 formed on the side longitudinal faces 1-1 and 1-2 has a width which is equal to the width of the side longitudinal faces 1-1 and 1-2 at a position of an upstream side portion of a microwave applied through the signal electrode 3 but continuously (gradually) decreases from a midstream portion to a downstream portion of the microwave. This provides a distribution or a variation to the shape of the side longitudinal faces 1-1 and 1-2 of the substrate 1.

It is to be noted that different materials are selected for the film 13 and the inner face of the housing 5G. Further, air gaps are provided between the housing 5G and the side longitudinal faces 1-1 and 1-2 on which the film 13 is formed so that the variation of the resonance frequency may be increased.

In the optical modulator module 15G according to the fourth embodiment of the present invention having the configuration described above, a distribution or a variation in shape is given to the side longitudinal faces 1-1 and 1-2 of the substrate 1 as shown in FIG. 8. Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, also in the fourth embodiment of the present invention, there are advantages that, according to the optical modulator 16A having the characteristic configuration in the side longitudinal faces 1-1 and 1-2 of the substrate 1, the mechanical strength is maintained without working the substrate itself such as to form a groove and the long-term reliability is secured while handling of the substrate is facilitated, and that a dip appearing in a frequency characteristic of a microwave from a DC component to a high-frequency component can be reduced, similarly as in the embodiments described hereinabove.

It is to be noted that, in the fourth embodiment described above, the film 13 vapor deposited on the longitudinal side walls 1-1 and 1-2 is formed such that the width thereof decreases continuously along the propagation direction of the microwave propagating in the signal electrode 3. However, according to the present invention, the configuration of the film 13 is not limited to the specific configuration, but the film 13 may be configured otherwise such that the width thereof increases continuously along the propagation direction of the microwave propagating in the signal electrode 3.

Further, the material of the film 13 described above may naturally be a metal material such as Au or a magnetic or dielectric material only if the material is different from that of the housing 5G.

[5] Description of the Fifth Embodiment

Figure 9:
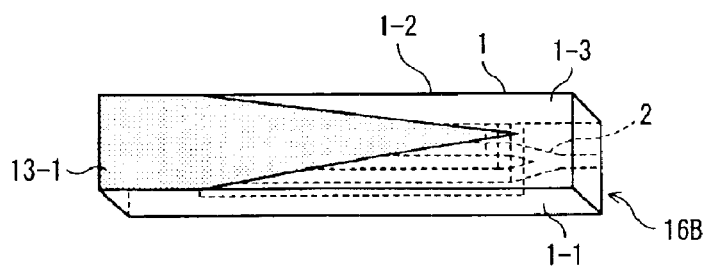
FIG. 9 is a schematic view showing part of an optical modulator module according to a fifth embodiment of the present invention.

FIG. 9 is a schematic view showing an optical modulator according to a fifth embodiment of the present invention. Also the optical modulator according to the fifth embodiment is mounted, in an actual communication system, on a housing 5G similar to that in the fourth embodiment described above so that it can be applied as an optical modulator module.

The optical modulator module according to the fifth embodiment is different from that according to the fourth embodiment described above in that a metal film 13-1 of, for example, Au is vapor deposited not on the side longitudinal faces 1-1 and 1-2 of the optical modulator 16B but at part of the rear face 1-3 of the substrate 1. It is to be noted that, in FIG. 9, substantially like elements to those of FIGS. 1(*a*) to 8 are denoted by like reference characters.

Here, also the optical modulator 16B in the fifth embodiment is produced by adding, to the process for producing the optical modulator 16 in the first to third embodiments described hereinabove, a step of vapor depositing the metal film 13-1 of, for example, Au at part of the rear face 1-3 of the substrate 1.

Further, the metal film 13-1 shown in FIG. 9 is formed in a pattern whose width continuously varies in the longitudinal direction of the substrate 1. More particularly, the film 13-1 is formed at part of the rear face 1-3 of the substrate 1 such that the shape of a section thereof parallel to the rear face 1-3 varies in the longitudinal direction of the substrate 1.

More particularly, the film 13-1 formed on the rear face 1-3 has a width which is substantially equal to the width of the rear face 1-3 at a position of an upstream side portion of a microwave applied through the signal electrode 3 but continuously (gradually) decreases from a midstream portion to a downstream portion of the microwave. This provides a distribution or a variation to the shape of the rear face 1-3 of the substrate 1.

It is to be noted that different materials are selected for the film 13-1 and the inner face of the housing 5G. Further, a groove not shown may be provided on the bottom wall of the housing 5G such that an air gap is provided between the rear face 1-3 on which the film 13-1 is formed and the bottom wall of the housing so that the variation of the resonance frequency may be increased.

In the optical modulator module according to the fifth embodiment of the present invention having the configuration described above, a distribution or a variation in shape is given to the bottom face 1-3 of the substrate 1 as shown in FIG. 9. Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, also in the fifth embodiment of the present invention, there are advantages that, according to the optical modulator 16B having the characteristic configuration in the rear face 1-3 of the substrate 1, the mechanical strength is maintained without working the substrate itself such as to form a groove and the long-term reliability is secured while handling of the substrate is facilitated, and that a dip appearing in a frequency characteristic of a microwave from a DC component to a high-frequency component can be reduced, similarly as in the embodiments described hereinabove.

It is to be noted that, in the fifth embodiment described above, the film 13-1 vapor deposited on the rear face is formed such that the width thereof decreases continuously along the propagation direction of the microwave propagating in the signal electrode 3. However, according to the present invention, the configuration of the film 13-1 is not limited to the specific configuration, but the film 13-1 may be configured otherwise such that the width thereof increases continuously along the propagation direction of the microwave propagating in the signal electrode 3.

Further, the material of the film 13-1 described above may naturally be a metal material such as Au or a magnetic or dielectric material only if the material is different from that of the housing 5G.

[6] Description of the Sixth Embodiment

Figure 10:
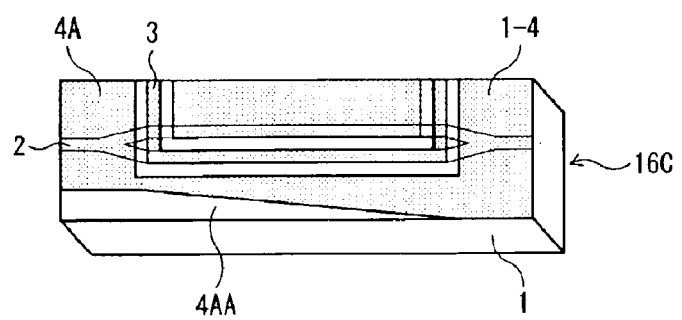
FIG. 10 is a schematic view showing part of an optical modulator module according to a sixth embodiment of the present invention.

FIG. 10 is a schematic view showing an optical modulator according to a sixth embodiment of the present invention. Also the optical modulator according to the sixth embodiment is mounted, in an actual communication system, on a housing 5G similar to that in the fourth embodiment described hereinabove so that it can be applied as an optical modulator module.

The optical modulator module according to the sixth embodiment is different from that according to the fourth embodiment described above in that a metal film 13 or 13-1 is not vapor deposited on the side longitudinal faces 1-1 and 1-2 or the rear face 1-3 of the substrate 1 of the optical modulator 16C but the grounding electrode 4A is configured such that the width thereof varies in a longitudinal direction. It is to be noted that, in FIG. 10, substantially like elements to those of FIGS. 1(*a*) to 9 are denoted by like reference characters.

In order to produce the optical modulator 16C in the sixth embodiment, the process of producing the optical modulator 16 in the first to third embodiments described hereinabove is modified such that, as a resist pattern to be formed at the portions other than the areas in which the signal electrode 3 and the ground electrode 4 are to be formed, a resist pattern is formed also in an area 4AA shown in FIG. 10 in addition to the area extending along the profile of the area in which the signal electrode 3 is to be formed. Then, through the succeeding steps described in [1-6] above, the ground electrode 4A having the characteristic pattern to the sixth embodiment can be formed together with the signal electrode 3.

Further, the ground electrode 4A shown in FIG. 10 is formed in a pattern whose width continuously varies in the longitudinal direction of the substrate 1. More particularly, the ground electrode 4A is formed such that the shape of a section thereof parallel to the optical waveguide face 1-4 varies in the longitudinal direction of the substrate 1.

More particularly, the ground electrode 4A formed on the optical waveguide face 1-4 has a width which is small at a position of an upstream side portion of a microwave applied through the signal electrode 3 but continuously (gradually) increases from a midstream portion to a downstream portion of the microwave. This provides a distribution or a variation to the shape of the ground electrode 4A as a component other than the substrate 1.

In the optical modulator module according to the sixth embodiment of the present invention having the configuration described above, a distribution or a variation in shape is given to the ground electrode 4A as shown in FIG. 10. Consequently, a distribution is provided to the frequency with which resonation occurs with a microwave applied to the signal electrode 3 thereby to prevent appearance of a sharp dip in a particular frequency band as seen, for example, from the frequency number-transparence characteristic (S21 characteristic) of FIG. 13.

In this manner, also in the sixth embodiment of the present invention, there are advantages that, thanks to the optical modulator having the characteristic configuration in the ground electrode 4A of the substrate 1, the mechanical strength is maintained without working the substrate itself such as to form a groove and the long-term reliability is secured while handling of the substrate is facilitated, and that a dip appearing in a frequency characteristic of a microwave from a DC component to a high-frequency component can be reduced, similarly as in the embodiments described hereinabove.

It is to be noted that, in the sixth embodiment described above, the ground electrode 4A is formed such that the width thereof increases continuously along the propagation direction of the microwave propagating in the signal electrode 3. However, according to the present invention, the configuration of the ground electrode 4A is not limited to the specific configuration, but the ground electrode 4A may be configured otherwise such that the width thereof decreases continuously along the propagation direction of the microwave propagating in the signal electrode 3.

[7] Description of the Seventh Embodiment

Figure 11:
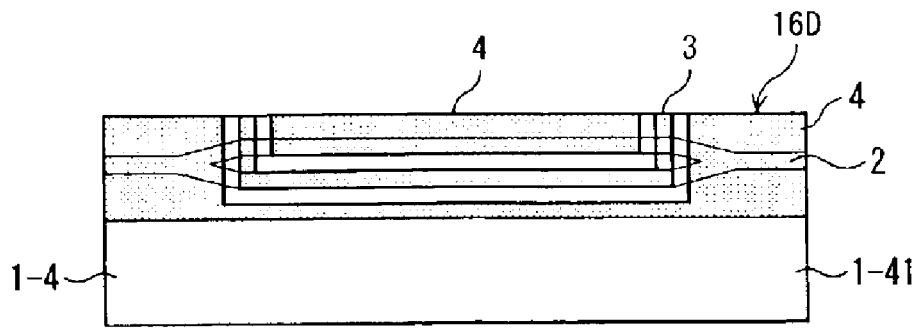
FIG. 11 is a schematic view showing part of an optical modulator module according a seventh embodiment of the present invention.

FIG. 11 is a schematic view showing an optical modulator according to a seventh embodiment of the present invention. Also the optical modulator according to the seventh embodiment is mounted, in an actual communication system, on a housing 5G similar to that in the fourth embodiment described hereinabove so that it can be applied as an optical modulator module.

The optical modulator module according to the seventh embodiment is different from that according to the sixth embodiment described above in that the optical waveguide 16D is configured such that an end portion 1-41 along a longitudinal edge of the surface (optical waveguide face 1-4) of a substrate 1 on which a waveguide 2 is formed is formed as an area in which none of the optical waveguide 2, a signal electrode 3 and a ground electrode 4 is formed. It is to be noted that, in FIG. 11, substantially like elements to those of FIGS. 1(a) to 10 are denoted by like reference characters.

In order to produce the optical modulator 16D in the seventh embodiment, the process of producing the optical modulator 16 in the first to third embodiments described hereinabove is modified such that, as a resist pattern to be formed at the portions other than the areas in which the signal electrode 3 and the ground electrode 4 are to be formed, a resist pattern is formed also in the area of the end portion 1-41 shown in FIG. 11 in addition to the area extending along the profile of the area in which the-signal electrode 3 is to be formed. Then, through the succeeding steps described in [1-6] above, the signal electrode 3 and the ground electrode 4 can be formed.

At this time, the end portion 1-41 may be formed such that the width thereof is greater than one half the overall width of the substrate. It is to be noted that, in this instance, by reducing the width of the ground electrode 4, the width of the end portion 1-41 can be assured while using a substrate of a size equal to that of the substrate used in the first to sixth embodiments described above.

In the optical modulator module according to the seventh embodiment of the present invention having the configuration described above, since the end portion 1-41 along a longitudinal edge of the optical waveguide face 1-4 is formed as an area in which none of the optical waveguide 2 and the electrodes 3 and 4 is formed, resonation which occurs with a microwave applied to the signal electrode 3 is suppressed thereby to prevent appearance of a sharp dip in a particular frequency band as seen, for example, from the frequency number-transparence characteristic (S21 characteristic) of FIG. 13.

In this manner, also in the seventh embodiment of the present invention, there are advantages that, thanks to the optical modulator 16D having the characteristic configuration in the optical waveguide face 1-4, the mechanical strength is maintained without working the substrate itself such as to form a groove and the long-term reliability is secured while handling of, the substrate is facilitated, and that a dip appearing in a frequency characteristic of a microwave from a DC component to a high-frequency component can be reduced, similarly as in the embodiments described hereinabove.

[8] Description of the Eighth Embodiment

Figure 12:
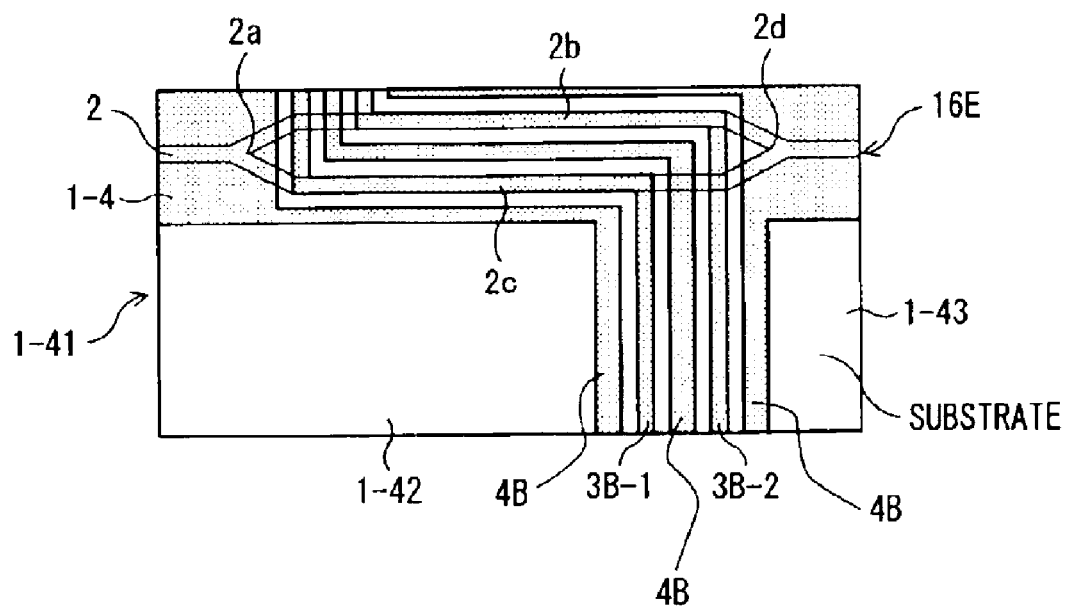
FIG. 12 is a schematic view showing part of an optical modulator module according to an eighth embodiment of the present invention.

FIG. 12 is a schematic view showing an optical modulator according to an eighth embodiment of the present invention. Also the optical modulator according to the eighth embodiment is mounted, in an actual communication system, on a housing 5G similar to that in the fourth embodiment described hereinabove so that it can be applied as an optical modulator module.

The optical modulator module according to the eighth embodiment is common to that according to the seventh embodiment described above in that the optical modulator 16E is configured such that an end portion 1-41 along a longitudinal edge of the surface (optical waveguide face 1-4) of a substrate 1 on which a waveguide 2 is formed is formed as an area in which none of the optical waveguide 2, signal electrodes 3B-1 and 3B-2 and a ground electrode 4B is formed, but is different in that the signal electrodes 3B-1 and 3B-2 and the ground electrode 4B have different formation patterns. It is to be noted that, in FIG. 12, substantially like elements to those of FIGS. 1(a) to 11 and 14 are denoted by like reference characters.

In particular, the two signal electrodes 3B-1 and 3B-2 are formed on two branched parallel waveguides 2b and 2c, respectively, of the Mach-Zehnder optical waveguide 2 across the opposite end points in the widthwise direction, and extend, each at one end thereof, in the end portion 1-41 side. Thus, connectors not shown [refer to reference numeral 6 in FIG. 1(a)] are connected to the opposite end points described above to push-pull drive the signal electrodes 3B-1 and 3B-2.

Further, the ground electrode 4B is formed in a predetermined spaced relationship from and along the profiles of the formation areas of the signal electrodes 3B-1 and 3B-2 while it is formed in a belt-like form along those portions of the signal electrodes 3B-1 and 3B-2 which extend in the end portion 1-41. Consequently, the ends of the signal electrodes 3B-1 and 3B-2 and the ground electrode 4B partition the end portion 1-41 into two areas 1-42 and 1-43.

In order to produce the optical modulator 16E in the eighth embodiment, the process of producing the optical modulator 16 in the first to third embodiments described hereinabove is modified such that, as a resist pattern to be formed at the portions other than the areas in which the signal electrode 3B and the ground electrode 4B are to be formed, a resist pattern is formed also in the area of the end portion 1-41 partitioned into the two areas 1-42 and 1-43 shown in FIG. 12 in addition to the area between the signal electrode 3B and the ground electrode 4B. Then, through the succeeding steps described in [1-6] above, the signal electrodes 3B-1 and 3B-2 and the ground electrode 4B can be formed.

Also at this time, the end portion 1-41 may be formed such that the width thereof is greater than one half the overall width of the substrate.

In the optical modulator module according to the eighth embodiment of the present invention having the configuration described above, the areas 1-42 and 1-43 in which no electrode is formed are provided from the characteristic shape of the signal electrodes 3B-1 and 3B-2 and the ground electrode 4B as shown in FIG. 12. Consequently, a distribution is provided to the frequency with which resonation occurs with a microwave applied to the signal electrodes 3B-1 and 3B-2 thereby to prevent appearance of a sharp dip in a particular frequency band as seen, for example, from the frequency number-transparence characteristic (S21 characteristic) of FIG. 13.

In this manner, also in the eighth embodiment of the present invention, there are advantages that, thanks to the optical modulator having the characteristic configuration in the optical waveguide face 1-4, the mechanical strength is maintained without working the substrate itself such as to form a groove and the long-term reliability is secured while handling of the substrate is facilitated, and that a dip appearing in a frequency characteristic of a microwave from a DC component to a high-frequency component can be reduced, similarly as in the embodiments described hereinabove.

[9] Others

The optical modulators 16A to 16D having the characteristic configurations in the fourth to eighth embodiments described above can naturally be applied to the optical modulator modules having a characteristic in the housing body or the lid portion in the first to third embodiments described hereinabove.

Further, as the material for the housing in any of the embodiments described above, not only brass or a magnetic substance but also, for example, copper or stainless steel may be used. Furthermore, in order to achieve an enhanced effect, it is effective to form the inner wall of the housing 5 from a dielectric substance such as glass, lithium niobate, ceramics or resin or from a magnetic material similar to that of the projecting portions 84 in the fourth modification to the first embodiment.

The present invention is not limited to the embodiment specifically described above, and variations and modifications can be made without departing from the scope of the present invention.

Further, an apparatus according to the present invention can be produced based on the embodiments described hereinabove.

What is claimed is:

1. An optical modulator module comprising:
   a substrate having an electro-optical effect;
   an optical modulator including an optical waveguide formed on a surface of said substrate, a signal electrode formed in a proximity of said optical waveguide and including a portion extending in parallel to said optical waveguide for applying an electric signal, and a ground electrode for applying a ground potential; and
   a housing in and to which said optical modulator is accommodated and secured,
   wherein a shape of a longitudinal section of a portion of said optical modulator module other than said substrate being asymmetrical with respect to a perpendicular line whereby the portion of signal electrode which extends in parallel to said optical waveguide is bisected in a longitudinal direction, and a shape of a longitudinal section of said housing is asymmetrical with respect to the perpendicular line.

2. The optical modulator module as claimed in claim 1, wherein the shape of the longitudinal sections of side walls, which oppose side longitudinal faces of said substrate with respect to a plane of said optical waveguide, of said housing parallel to the plane of said optical waveguide is asymmetrical with respect to the perpendicular line.

3. The optical modulator module as claimed in claim 1, wherein the shape of the longitudinal sections of side walls, which oppose side longitudinal faces of said substrate with respect to a plane of said optical waveguide, of said housing perpendicular to a plane of said optical waveguide is asymmetrical with respect to the perpendicular line.

4. The optical modulator module as claimed in claim 1, wherein
   said housing includes a housing body in and to which said optical modulator is accommodated and secured and a lid element for covering said housing body, and
   the shape of the longitudinal section of said lid element parallel to a plane of said optical waveguide is asymmetrical with respect to the perpendicular line.

5. The optical modulator module as claimed in claim 1, wherein
   said housing includes a housing body in and to which said optical modulator is accommodated and secured and a lid element for covering said housing body, and
   the shape of the longitudinal section of said lid element perpendicular to a plane of said optical waveguide is asymmetrical with respect to the perpendicular line.

6. The optical modulator module as claimed in claim 1, wherein the shape of the longitudinal section of a bottom wall, which opposes a rear face of said substrate with respect to a plane of said optical waveguide, of said housing parallel to the plane of said optical waveguide is asymmetrical with respect to the perpendicular line.

7. The optical modulator module as claimed in claim 1, wherein the shape of the longitudinal section of a bottom wall, which opposes a rear face of said substrate with respect to a plane of said optical waveguide, of said housing perpendicular to the plane of said optical waveguide is asymmetrical with respect to the perpendicular line.

8. The optical modulator module as claimed in claim 1, wherein the opposite side portions of said housing which oppose the opposite side longitudinal faces of said substrate with respect to a plane of said optical waveguide are located at positions symmetrical with each other with respect to said substrate.

9. The optical modulator module as claimed in claim 1, wherein an inner face of said housing is formed partly or entirely from a metal.

10. The optical modulator module as claimed in claim 1, wherein en inner face of said housing is formed partly or entirely from a magnetic material.

11. The optical modulator module as claimed in claim 1, wherein an inner face of said housing is formed partly or entirely from a dielectric material.

12. The optical modulator module as claimed in claim 1, wherein a film is formed at part of a side longitudinal face of said substrate with respect to a plane of said optical waveguide such that the shape of a section thereof parallel to the side longitudinal face of said substrate varies in the longitudinal direction.

13. The optical modulator module as claimed in claim 12, wherein said film is made of a metal.

14. The optical modulator module as claimed in claim 12, wherein said film is made of a magnetic material.

15. The optical modulator module as claimed in claim 12, wherein said film is made of a dielectric material.

16. The optical modulator module as claimed in claim 12, wherein a gap is provided between said film and an inner face of said housing.

17. The optical modulator module as claimed in claim 12, wherein said film and an inner face of said housing are made of different materials from each other.

18. The optical modulator module as claimed in claim 1, wherein a film is formed at part of a rear face of said substrate with respect to a plane of said optical waveguide such that the shape of a section thereof parallel to the rear face of said substrate varies in the longitudinal direction.

19. The optical modulator module as claimed in claim 18, wherein said film is made of a metal.

20. The optical modulator module as claimed in claim 18, wherein said film is made of a magnetic material.

21. The optical modulator module as claimed in claim 18, wherein said film is made of a dielectric material.

22. The optical modulator module as claimed in claim 18, wherein a gap is provided between said film and an inner face of said housing.

23. The optical modulator module as claimed in claim 18, wherein said film and an inner face of said housing are made of different materials from each other.

24. The optical modulator module as claimed in claim 1, wherein the shape of a section of said ground electrode parallel to a plane of said optical waveguide varies in the longitudinal direction.

25. The optical modulator module as claimed in claim 1, wherein the shape of the section varies continuously in the longitudinal direction.

26. The optical modulator module as claimed in claim 1, wherein the shape of the section varies stepwise in the longitudinal direction.

27. The optical modulator module as claimed in claim 26, wherein the shape of the section varies stepwise in a plurality of stages in the longitudinal direction.

28. An optical modulator, comprising:
    a substrate having an electro-optical effect;
    an optical waveguide formed on a surface of said substrate; and
    a signal electrode formed in the proximity of said optical waveguide and including a portion extending in parallel to said optical waveguide for applying an electric signal and a ground electrode for applying a ground potential;
    a film being formed at part of a side longitudinal face or a rear face of said substrate with respect to a plane of said optical waveguide such that the shape of a section of said film parallel to the side longitudinal face or the rear face of said substrate varies in a longitudinal direction of said substrate.

29. An optical amplitude modulator, comprising:
    a substrate having an electro-optical effect;
    an optical waveguide formed on a surface of said substrate;
    a signal electrode formed in the proximity of said optical waveguide and including a portion extending in parallel to said optical waveguide for applying an electric signal; and
    a ground electrode for applying a ground potential,
    wherein a width of said ground electrode in which a domain faces to said portion of said signal electrode varies with respect to the direction of said optical waveguide.

30. An optical modulator, comprising:
    a substrate having an electro-optical effect;
    an optical waveguide formed on a surface of said substrate; and
    a signal electrode formed in the proximity of said optical waveguide and including a portion extending in parallel to said optical waveguide for applying an electric signal and a ground electrode for applying a ground potential;
    a side portion which forms a major side of the surface of said substrate being formed as an area in which none of said optical waveguide, said signal electrode and said ground electrode is formed.

31. The optical modulator as claimed in claim 30, wherein the width of the side portion of the surface of said substrate is greater than one half the overall width of said substrate.

32. The optical modulator as claimed in claim 30, wherein one end portions of said signal electrode and said ground electrode partition the side portion of said substrate into two areas.

33. An optical modulator module, comprising:
    a substrate having an electro-optical effect;
    an optical modulator including an optical waveguide formed on surface of said substrate, a signal electrode formed in the proximity of said optical waveguide and including a portion extending in parallel to said optical waveguide for applying an electric signal, and a ground electrode for applying a ground potential; and
    a housing in and to which said optical modulator is accommodated and secured,
    wherein a shape of a longitudinal section of a portion of said optical modulator module other than said substrate being asymmetrical with respect to a perpendicular line whereby the portion of said signal electrode which extends in parallel to said optical waveguide is bisected in a longitudinal direction, and a film is formed at part of a side longitudinal face of said substrate with respect to a plane of said optical waveguide such that the shape of a section thereof parallel to the side longitudinal face of said substrate varies in the longitudinal direction.

34. The optical modulator module as claimed in claim 33, wherein said film is made of a metal.

35. The optical modulator module as claimed in claim 33, wherein said film is made of a magnetic material.

36. The optical modulator module as claimed in claim 33, wherein said film is made of a dielectric material.

37. The optical modulator module as claimed in claim 33, wherein a gap is provided between said film and an inner face of said housing.

38. The optical modulator module as claimed in claim 33, wherein said film and an inner face of said housing are made of different materials from each other.

39. An optical modulator module, comprising:
    a substrate having a electro-optical effect;
    an optical modulator including an optical waveguide formed on a surface of said substrate, a signal electrode formed in the proximity of said optical waveguide and including a portion extending in parallel to said optical waveguide for applying an electric signal, and a ground electrode for applying a ground potential; and
    a housing in and to which said optical modulator is accommodated and secured,
    wherein a shape of a longitudinal section of a portion of said optical modulator module other than said substrate being asymmetrical with respect to a perpendicular line whereby the portion of said signal electrode which extends in parallel to said optical waveguide is bisected in a longitudinal direction, and a film is formed at part of a rear face of said substrate with respect to a plane of said optical waveguide such that the shape of a section thereof parallel to the rear face of said substrate varies in the longitudinal direction.

40. The optical modulator module as claimed in claim 39, wherein said film is made of a metal.

41. The optical modulator module as claimed in claim 39, wherein said film is made of a magnetic material.

42. The optical modulator module as claimed in claim 39, wherein said film is made of a dielectric material.

43. The optical modulator module as claimed in claim 39, wherein a gap is provided between said film and an inner face of said housing.

44. The optical modulator module as claimed in claim 39, wherein said film and an inner face of said housing are made of different materials from each other.

45. An optical modulator, comprising:
a substrate having an electro-optical effect;
an optical waveguide formed on a surface of said substrate; and
a signal electrode formed in the proximity of said optical waveguide and including a portion extending in parallel to said optical waveguide for applying an electric signal and a ground electrode for applying a ground potential,
wherein an end portion which forms a major side of the surface of said substrate on which said optical waveguide is formed, being formed as an area in which none of said optical waveguide, said signal electrode and said ground electrode is formed, wherein a width of the end portion of the surface of said substrate is greater then one half the overall width of said substrate.

46. An optical waveguide device, comprising;
a substrate having an electro-optical effect and having a rectangular surface on which is formed a Mach Zehnder type optical waveguide including a pair of optical waveguides for electro-optic interaction;
a signal electrode which includes a portion in the proximity of one of said pair of optical waveguides and two end portions at one long side of said rectangular surface; and
a ground electrode having two areas partly formed over said rectangular surface as to be separated with respect to said signal electrode, wherein one of said two areas of said ground electrode reaches said one long side of said rectangular surface, but the other of said two areas of said ground electrode comes short of another long side of said rectangular surface.

47. The optical waveguide device as set forth in claim 46, wherein said one of said two areas of said ground electrode is surrounded by said signal electrode and said one long side of said rectangular surface.

48. An optical waveguide device, comprising;
a substrate having an electro-optical effect and having a rectangular surface on which formed a Mach Zehnder type optical waveguide including a pair of optical waveguides for electro-optic interaction;
a signal electrode formed as to include a portion in the proximity of one of said pair of optical waveguides and one end portion at one long side of said rectangular surface and another end portion at another side of said rectangular surface;
a ground electrode having two areas formed separated with respect to said signal electrode, wherein one of said two areas of said ground electrode is formed over said rectangular surface except an area of said rectangular surface along said another side of said rectangular surface.

* * * * *

UNITED STATES PATENT AND TRADEMARK OFFICE
CERTIFICATE OF CORRECTION

PATENT NO. : 6,873,748 B2
DATED : March 29, 2005
INVENTOR(S) : Sugiyama et al.

It is certified that error appears in the above-identified patent and that said Letters Patent is hereby corrected as shown below:

Column 21,
Line 56, insert -- said -- after "portion of".

Column 22,
Line 45, change "en" to -- an --.

Column 24,
Line 15, insert -- a -- after "formed on".

Column 25,
Line 23, change "then" to -- than --.

Signed and Sealed this

Eighth Day of November, 2005

JON W. DUDAS
*Director of the United States Patent and Trademark Office*